United States Patent [19]

Sato et al.

[11] 4,110,027

[45] Aug. 29, 1978

[54] IMAGE TRANSFER MECHANISM

[75] Inventors: Yasushi Sato, Kawasaki; Hiroo Ichihashi, Tokyo, both of Japan

[73] Assignee: Canon Kabushiki Kaisha, Tokyo, Japan

[21] Appl. No.: 807,741

[22] Filed: Jun. 17, 1977

[30] Foreign Application Priority Data

Jul. 12, 1976 [JP] Japan .................................. 51-82643

[51] Int. Cl.[2] .............................................. G03B 15/00

[52] U.S. Cl. .................................... 355/3 TR; 226/94; 226/95

[58] Field of Search ................. 355/3 TR, 3 TE, 3 R, 355/16; 96/1.4; 427/24; 101/1, DIG. 13; 226/94, 95, 115, 117

[56] References Cited

U.S. PATENT DOCUMENTS

| | | | |
|---|---|---|---|
| 3,781,105 | 12/1973 | Meagher | 355/3 TR |
| 3,893,760 | 7/1975 | Thettu | 355/3 TR |
| 4,057,343 | 11/1977 | Gontero | 355/16 |
| 4,062,631 | 12/1977 | Hayakawa | 355/3 R |

*Primary Examiner*—Richard L. Moses
*Attorney, Agent, or Firm*—Fitzpatrick, Cella, Harper & Scinto

[57] ABSTRACT

This specification discloses an improvement in a mechanism for transferring the image on an image-bearing member onto a continuous transfer medium by bringing said transfer medium into contact with the image on the image-bearing member. The mechanism of the prior art has been provided with tractors disposed upstream and beyond the image transfer section for conveying the continuous transfer medium. However, the drive timing between these two tractors have been extremely difficult to provide and the drive control mechanism has been very complex. In addition, a control system for the starting of image transfer has been required and these control systems have been very cumbersome. The invention simplifies the image transfer mechanism by using a conveyor capable of conveying the transfer medium by slidably holding the same, and ensures stable conveyance of the transfer medium.

6 Claims, 5 Drawing Figures

IMAGE TRANSFER MECHANISM

BACKGROUND OF THE INVENTION

1. Field of the Invention

This invention relates to a mechanism for transferring the image on an image-bearing member to a continuous transfer medium, and more particularly to mechanism for transferring an electrostatic latent image or a developed image on an image-bearing member such as photosensitive medium or insulative medium to a continuous transfer medium such as fan fold paper or rolled paper.

2. Description of the Prior Art

An image transfer mechanism for transferring the image on an image-bearing member to a transfer medium will be described with respect to an application thereof to an electrophotographic apparatus using a drum-shaped photo-sensitive medium as the image-bearing member.

Heretofore, electrophotographic apparatuses for recording images by transferring developed images on a photosensitive medium to a transfer medium have sometimes been utilized as the high-speed output device of an information processing system such as electronic computer or the like. In such a case, continuous paper such as fan fold paper or rolled paper has usually been employed as the transfer medium because of its ease of handling and its stability of conveyance. With these apparatuses, in order that developed images intermittently formed on the photosensitive medium in accordance with the presence or absence of recorded information may be transferred to such continuous paper, it is necessary that the transfer paper be intermittently conveyed and the image transfer, namely, the transfer corona charging, take place intermittently in synchronism with the developed images on the photosensitive medium and further that the pressure of an image transfer roller be ON-OFF-controlled to separate the transfer medium from the photosensitive medium to thereby prevent the transfer medium from being stained by fog or the like. However, the method of the prior art has suffered from the following disadvantages which will hereinafter be described by reference to FIG. 1 of the accompanying drawings.

In FIG. 1 which is a schematic cross-sectional view illustrating an example of the apparatus according to the prior art, transfer of the developed image on a photosensitive medium 1 is effected by urging a transfer medium 2 against the photosensitive medium 1 by means of image transfer rollers 4 and 5 (or interior guides) as the transfer medium is conveyed by tractors 6 and 7 having feed pins and being disposed respectively upstream and downstream of the image transfer section, while applying a voltage to the transfer medium by an image transfer corona discharger 3. On the other hand, when the developed image formed on the photosensitive medium in accordance with information is exhausted, the voltage application from the discharger 3 is stopped while, at the same time, the image transfer rollers 4 and 5 are retracted from the photosensitive medium 1. Thereby, the pressure force urging the transfer medium 2 against the photosensitive medium 1 is nulled. At this time, it is necessary to keep the balance between the amount of conveyance by the tractor 6 upstream of the image transfer section and the amount of conveyance by the tractor 7 downstream thereof, to delay the stoppage of the tractor 7 downstream of the image transfer section with respect to the stoppage of the other tractor 6 to thereby prevent the occurrence of wrinking of the transfer medium or unsatisfactory image transfer which would otherwise result from the slack of the transfer medium. However, it is extremely difficult to keep timing between the drives of these two tractors 6 and 7 and an effort to achieve it would result in a complicated construction of the drive control mechanism. In addition to such drive control, the control for the starting of image transfer would be required and these control systems would be very cumbersome. Further, when the expansion or contraction of the transfer medium is taken into account, stable conveyance will be more difficult to do particularly where the image to be transferred is a visible image developed by the liquid development. As a solution to such problem, it would occur to mind, for example, to move each tractor bodily at the image transfer position and effect ON-OFF of the image transfer, but this would involve displacing the drive systems which would unavoidably lead to complication of the apparatus and further to poorer responsivity of the apparatus.

SUMMARY OF THE INVENTION

It is an object of the present invention to provide an image transfer mechanism which is simplified in construction.

It is another object of the present invention to provide an image transfer mechanism which effects stable conveyance of transfer medium.

It is still another object of the present invention to provide an image transfer mechanism which enables highspeed intermittent image transfer to be accurately effected by a simple construction.

The present invention which achieves the above objects provides first and second conveyor means disposed respectively upstream and downstream of an image transfer section having means for applying an image transfer voltage to a transfer medium which is in contact with an image-bearing member. The first conveyor means is located in the transfer medium conveyance path before the image transfer section to intermittently convey the transfer medium at a constant velocity. The second means is located beyond the image transfer section to convey the transfer medium while slidably holding the non-image-bearing surface of the transfer medium.

The first conveyor means may specifically be a tractor or roller having feed pins provided on the surface thereof if the transfer medium in use has marginal punches at an edge thereof like the fan fold paper used in the recording by electronic computer. Particularly, where the first conveyor means is a roller, the invention is applicable not only to fan fold paper but also continuous paper like rolled paper. Also, the first conveyor means effects at least conveyance and stoppage of the transfer medium, but may act to return the transfer medium as required. Next, the second conveyor means may specifically be a combination of a suction mechanism using a suction fan and a porous belt, or an electrostatic absorption belt having an electrostatic adsorbing power. When there is no tension acting on the transfer medium, the second conveyor means forwardly conveys the transfer medium by rotational or pivotal movement. However, once a tension acts on the transfer medium to stop the same, the transfer medium would not slide forwardly on the second conveyor means.

The image-bearing member referred to herein means a photosensitive medium or a member capable of retaining charges thereon, and the image on these image bearing members means an electrostatic latent image formed by the electrophotographic process, or a visible image resulting from such latent image being developed by the use of developer. The transfer medium is not restricted to the above-mentioned fan fold paper or rolled paper, but may be a continuous insulative sheet.

The invention will become more fully apparent from the following detailed description thereof taken in conjunction with the accompanying drawings.

DESCRIPTION OF THE PREFERRED EMBODIMENT

The invention will hereinafter be described in detail with respect to embodiments thereof.

Figure 2:
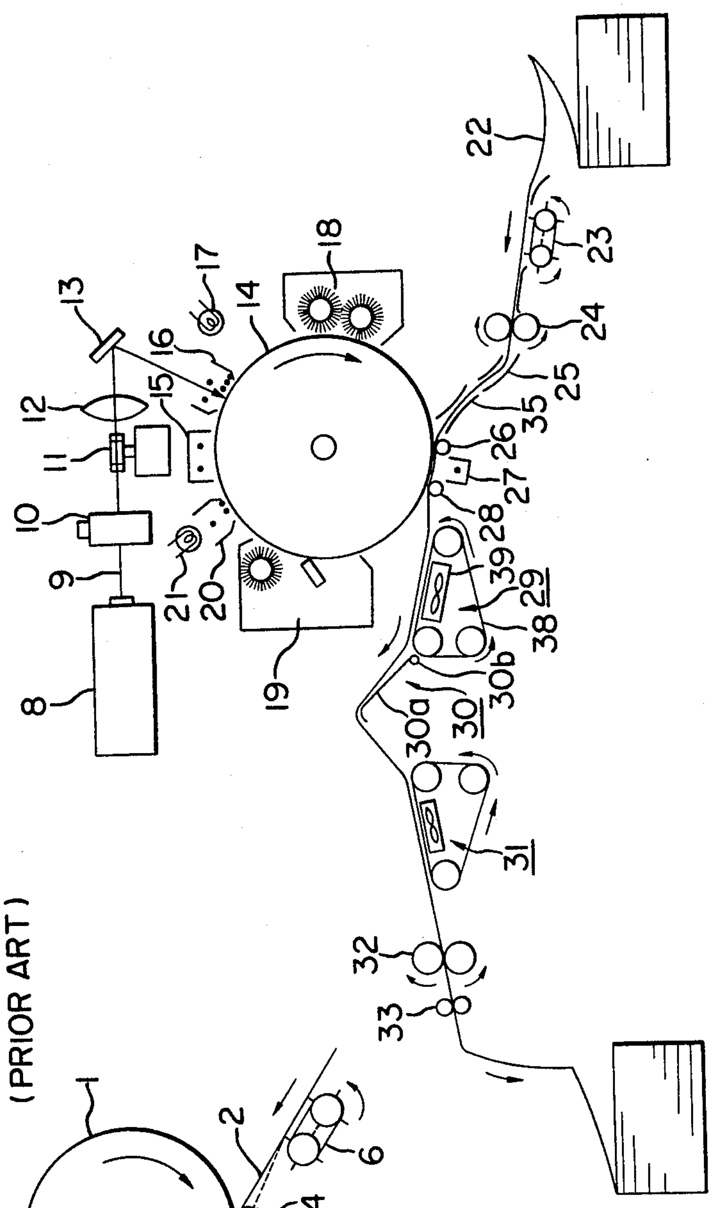
FIG. 2 is a schematic cross-sectional view showing a high-speed image recording apparatus to which the present invention is applied.
Figure 1:
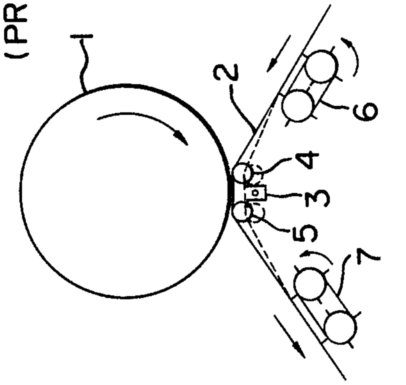
FIG. 1 (PRIOR ART)
FIG. 1 is a schematic cross-sectional view showing the image transfer section of the prior art apparatus for effecting the intermittent image transfer.

Referring to FIG. 2 which is a schematic illustration of the entire apparatus to which the present invention is applied, a laser beam 9 oscillated from a laser oscillator 8 is modulated in accordance with the input signal to a modulator 10, whereafter the modulated laser beam is scanned by a rotatable polygonal mirror 11 and projected for image exposure upon a photosensitive medium 14 rotating in the direction of arrow. The image exposure means is not restricted to the shown one but may be a cathode ray tube or a plasma display tube.

The photosensitive medium 14 used as the image-bearing member permits application thereto of various electrophotographic processes already proposed, and the image transfer mechanism of the present invention will herein be described by taking as an example the process disclosed in our Japanese Patent Publication No. 23910/1967.

The photosensitive medium 14, which basically comprises a conductive back-up member, a photoconductive layer and an insulating surface layer, is uniformly charged by a primary corona charger 15, and then exposed to an optical image while at the same time subjected to AC corona discharge by an AC corona discharger 16, and further the whole surface thereof is uniformly illuminated by a whole surface exposure lamp 17. As the result, an electrostatic latent image corresponding to the optical image is formed on the surface of the photosensitive medium 14. Thereafter, the electrostatic latent image is developed into a visible image by a developing device 18 with the aid of toner or like developer composed chiefly or charged toner particles. The developed image is transferred to fan fold paper 22 (hereinafter referred to as transfer paper or simply as paper) by means of image transfer rollers 26, 28 and by utilization of the electric field produced by an image transfer charger 27 as the paper is conveyed by a tractor 23 which is a first conveyor means and by first intermediate conveyor means 29 having a suction fan and a porous endless conveyor belt. The first intermediate conveyor means 29 is the second conveyor means of the present invention.

After the transfer of the developed image from the photosensitive medium 14 to the transfer paper 22 has been effected at the image transfer section, the transfer paper 22 is further conveyed to a heat roller fixing device 32 by second intermediate conveyor means 31 similar in construction to the first intermediate conveyor means 29. After being heated and fixed by the fixing device 32, the transfer paper 22 is further conveyed outwardly of the recording apparatus by conveyor rollers 33. A buffer ring plate 30 is disposed between the first 29 and the second intermediate conveyor means 31. Such slack of the transfer paper 22 ensures the degree of freedom with which the transfer paper 22 may be drawn back when it repeats contact or non-contact with the photosensitive medium at the image transfer section. Absence of such a safety device would cause tearing of the transfer paper 22 or damage of the marginal punches when the transfer paper 22 is drawn back. The buffer ring plate 30 also serves as a switch for controlling the state of contact between the fixing device 32 and the transfer paper 22. More specifically, since a predetermined relationship cannot be maintained between the amount of the transfer paper 22 conveyed by the fixing device 32 and that by the first and second conveyor means, the fixing device 32 presses the transfer paper 22 for fixation only when a predetermined amount of the transfer paper 22 is slackened by the buffer ring plate 30. When the amount of the transfer paper 22 slackened by the plate 30 is less than the predetermined amount, the fixing device 32 will become open to withdraw its engagement with the transfer paper.

On the other hand, the successive portions of the photosensitive medium 14 having passed through the image transfer section are cleaned by a cleaning device 19 to remove any residual developer therefrom, and subjected to the uniform exposure by a lamp 21 and to the discharging by an AC corona discharger 20 for removal of residual charge, whereby the photosensitive medium becomes ready for another cycle of image formation.

Figure 3:
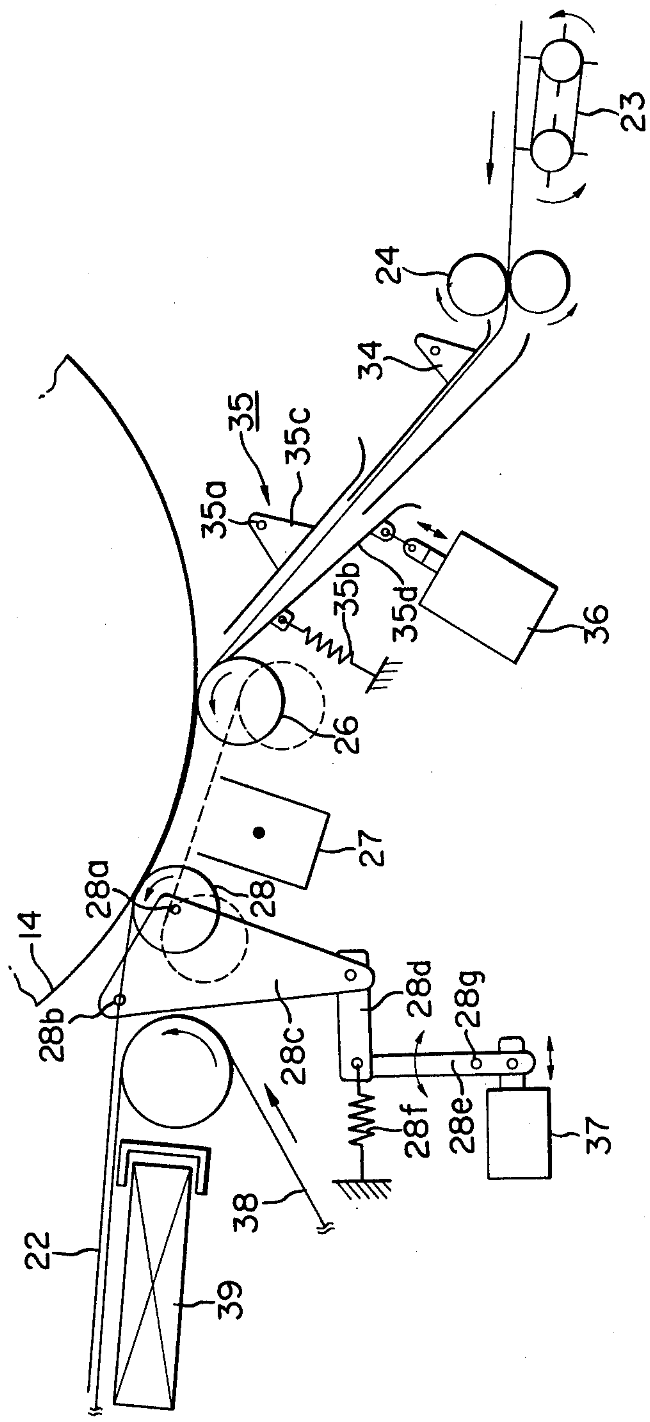
FIG. 3 is an enlarged illustration of the image transfer section of the FIG. 2 apparatus.

The construction of the image transfer section in the above-described apparatus will now be described with reference to the drawings. FIG. 3 is an illustration of the construction of the image transfer section in the apparatus of FIG. 2. In FIG. 3, a first image transfer roller 26 and a second image transfer roller 28 each having their surface covered with insulative rubber are proximate to each other with an image transfer corona charger 27 disposed therebetween. These rollers 26 and 28 serve to prevent disturbance of the image caused by the expansion of the corona discharge; that is, they prevent scattering of the developer and halation of the formed image caused by the fluctuation of the electric field created by the corona discharge during the contact or the separation between the paper 22 and the photosensitive medium 14, and also serve to eliminate any unsatisfactory image transfer which would otherwise result from the transfer paper 22 being floated by its pressure contact with the photosensitive medium 14, and especially in the case that the transfer paper 22 is fan fold paper as in the present embodiment, to prevent the unsatisfactory image transfer which would otherwise result from the floating of the transfer paper from the photosensitive medium 14 attributable to the perforated portion of the fan fold paper, thereby ensuring stable and uniform image transfer to occur. When the information recorded on the photosensitive medium 14 becomes exhausted while the image transfer is being continued in the position of FIG. 3, that is, when the last portion of the image information has been transferred, the first 26 and the second image transfer roller 28 are caused by a first 36 and a second plunger 37 to assume their positions indicated by broken lines in FIG. 3 in order to release the transfer paper 22 from its contact with the photosensitive medium 14.

The operations of the first and second image transfer rollers 26 and 28 will further be described. The image transfer rollers 26 and 28 are supported by discrete support members and may individually be displaced to the broken-line positions by the actuations of the first and second plungers 36 and 37, respectively. The operation of the first image transfer roller 26 will first be explained. When the voltage applied to the first plunger 36 is cut off, this plunger 36 is released to permit an upper guide plate 35 to be pivotally moved about a pivot 35*a* by the bias force of a spring 35*b*. Such movement of the guide plate 35 is possible because the upper and lower plates 35*c* and 35*d* thereof are secured to a common support member (not shown). Since the support member supporting this guide plate 35 also supports the rotary shaft of the first image transfer roller 26, the roller 26 is moved to the broken-line position with the movement of the guide plate 35. The plunger 36 and the spring 35*b* may be directly attached to said support member. Describing now the operation of the second image transfer roller 28, the rotary shaft 28*a* of the roller 28 is mounted on a rocking plate 28*c* pivotable about a pivot 28*b* and the rocking plate 28*c* is pivotable by the actuation of arm members 28*d* and 28*e* which together constitute a linkage. Thus, when the voltage applied to the second plunger 37 is cut off, this plunger 37 is released to permit the arm member 28*e* to be pivotally moved about a pivot 28*g* by the bias force of a spring 28*f*. By this, the arm member 28*d* is pulled to pivotally move the rocking plate 28*c* and thereby displace the second image transfer roller 28 to its broken-line position.

As described above, the first and second image transfer rollers 26 and 28 move the transfer paper 22 away from the photosensitive medium 14 upon release of the plungers 36 and 37, thus ensuring separation of the transfer paper from the photosensitive medium. In the shown embodiment of the apparatus, there is provided an image transfer charger 27 fixed to the image transfer section, but use may be made of another image transfer roller movable with the rollers 26 and 28. Also, the first and second image transfer rollers 26 and 28 may be replaced by unrotatable guide bars provided at the locations of the rollers 26 and 28 and in parallelism to the rotary shaft of the photosensitive medium 14.

On the other hand, the first conveyor means or tractor 23 and the intermediate conveyor roller 24 which are conveying the transfer paper 22 at a constant velocity are driven in synchronism with the developed image on the photosensitive medium 14 and therefore, when the recorded information on the photosensitive medium becomes exhausted and the image transfer is completed, these conveyor means are stopped from conveying the transfer paper 22. Usually, the transfer paper 22 on the porous conveyor belt 38 of the first intermediate conveyor means 29 which is moving round at a velocity higher than the peripheral velocity of the tractor 23 and the intermediate conveyor rollers 24 during image transfer is moved forward by a friction force created with respect to the conveyor belt 38 by a suction fan 39, but upon stoppage of the tractor 23 and the intermediate conveyor rollers 24, the transfer paper 22 is separated from the photosensitive medium 14 and stopped from moving with the friction force still imparted thereto, namely, with a tension still imparted thereto, although the belt 38 continues to move round.

When the image recording onto the photosensitive medium 14 is resumed, the image transfer rollers 26 and 28 again urge the transfer paper 22 against the photosensitive medium and a voltage is applied to the image transfer corona charger 27, whereby image transfer is resumed. At the time of this resumption, the transfer paper 22 on the porous conveyor belt 38 approaches the photosensitive medium while slipping on the belt, and resumes its forward movement with the restarted drive of the tractor 23 and intermediate conveyor roller 24.

Figure 4:
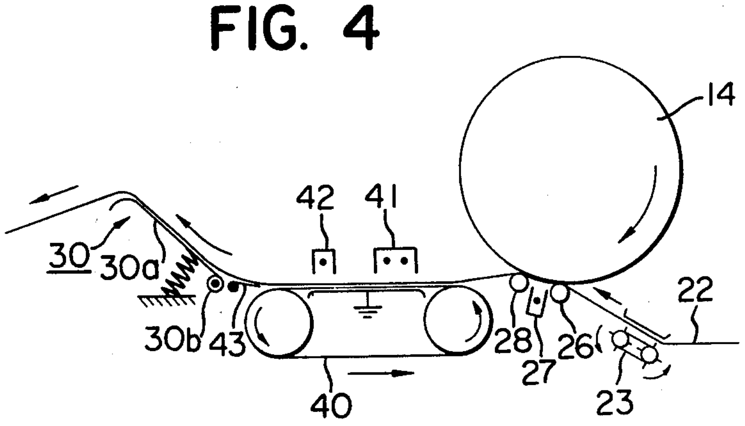
FIGS. 4 and 5 illustrate another embodiment of second conveyor means.

Thus, according to the image transfer mechanism of the present invention, the transfer paper is always maintained under tension and therefore free of wrinkling even during the image transfer of the type which is intermittently effected with the transfer paper in contact and non-contact with the photosensitive medium and moreover, the conveyance of the transfer paper utilizing the friction force between the transfer paper and the conveyor means after image transfer only requires the conveyor means to continue constant velocity movement, thus eliminating any special velocity control. In addition, as compared with the prior art mechanism, the mechanism of the present invention enables sufficiently stable conveyance of transfer paper. In the above-described embodiment, control of the conveyance of transfer paper is accomplished by both the tractor and the intermediate rollers, whereas this could also be accomplished by only the tractor 23 or only the intermediate rollers 24. Further, the tension imparted to the transfer paper after the image transfer may also be achieved by utilizing electrostatic attraction instead of the suction force. FIG. 4 shows an embodiment using such means. In FIG. 4, a belt 40 is conduction-treated and grounded and DC corona discharge is applied from a corona charger 41 to the transfer paper 22 on the belt 40. A charge opposite in polarity to the charge on the surface of the transfer paper 22 charged by said charger 41 is induced in the belt 40, so that the transfer paper 22 is electrostatically adsorbed to the belt 40 by the actions of the charges in the belt 40 and transfer paper 22. Since the belt 40 is moving round at a velocity higher than the velocity of the transfer paper 22, a friction force is created between the belt 40 and the transfer paper 22 while a tension is developed in the transfer paper 22, whereby the transfer paper is conveyed. Further, the charge in the transfer paper is removed by an AC corona discharger so that the adsorption between the paper and the belt 40 is lost, thereby permitting the paper to be separated from the belt 40 by a separating pawl 43. During non-image transfer, the transfer paper 22 remains under the tension created by the friction force resulting from the electrostatic adsorption, so that the transfer paper 22 may likewise be separated from the photosensitive medium 14.

Figure 5:
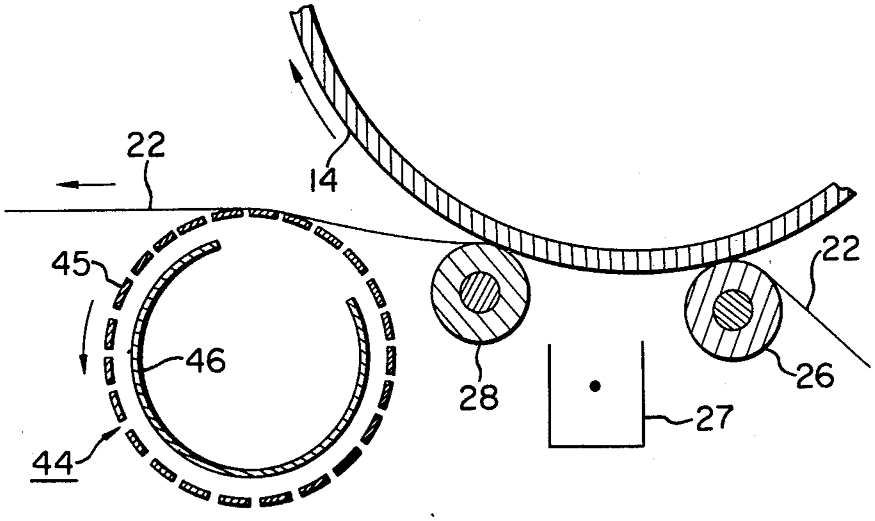

The second conveyor means disposed behind the image transfer section is not restricted to the belt member but may also be a drum-shaped means as shown in FIG. 5. The first intermediate conveyor 44 of FIG. 5 which is the second conveyor means has a porous drum 45 normally rotating at a constant velocity in the direction of arrow and a suction mechanism within the porous drum 45. In FIG. 5, reference numeral 46 designates a shield member for orienting the sucked air stream which is fixed at the shown position within the porous drum 45. Of course, the porous drum 45 may be replaced by an electrostatic adsorbing drum, and the present invention covers combinations and modifications of these various means.

As has hitherto been described, the present invention provides first conveyor means for conveying and stopping the transfer paper disposed with the image transfer section therebetween, and second conveyor means adapted to continue operating while frictionally sliding with respect to the transfer paper when the transfer paper is stationary, thus substantially refraining from conveying the transfer paper at such time. The mechanism of the present invention can impart a moderate tension to the transfer paper even when it is stationary and therefore, the transfer paper is free of wrinkles even if it is moved toward the photosensitive medium. Further, even if the transfer paper is conveyed backwardly during such movement, it can also be drawn back without being broken. Thus, the present invention eliminates the disadvantages peculiar to the prior art image transfer mechanism which effects the intermittent conveyance of transfer paper, and it also enables high-speed intermittent image transfer.

What we claim is:

1. An image transfer mechanism for transferring the image on an image-bearing member onto a continuous transfer medium by bringing said transfer medium into contact with the image on said image-bearing member wherein said transfer medium is conveyed along a path past a transfer section, said mechanism comprising first conveyor means disposed upstream of the image transfer section in the transfer medium conveyance path for intermittently conveying the transfer medium at a constant velocity, second conveyor means disposed downstream of said image transfer section for conveying said transfer medium while slidably holding the non-image-bearing surface thereof, and image transfer means disposed at the image transfer section between said two conveyor means.

2. An image transfer mechanism according to claim 1, wherein said second conveyor means includes a suction mechanism for engaging the transfer medium.

3. An image transfer mechanism according to claim 1, wherein said second conveyor means comprise an electrostatic adsorption device.

4. An image transfer mechanism according to claim 2, wherein said first conveyor means includes feed pins corresponding to marginal punches provided in the transfer medium.

5. An image transfer mechanism according to claim 2, wherein said first conveyor means comprises at least a pair of rollers.

6. An image transfer mechanism for transferring the image on an image-bearing member onto a continuous transfer medium by bringing said transfer medium into contact with the image on said image-bearing member wherein said transfer medium is conveyed along a path past a transfer section, said mechanism comprising first conveyor means disposed upstream of the image transfer section in the transfer medium conveyance path for intermittently conveying the transfer medium at a constant velocity, second conveyor means disposed downstream of said image transfer section for conveying said transfer medium while slidably holding the non-image-bearing surface thereof, a plate disposed downstream of said second conveyor means and pivotable at one end thereof for slackening the transfer medium, and image transfer means disposed at the image transfer section between said two conveyor means.

* * * * *